Patented July 4, 1933

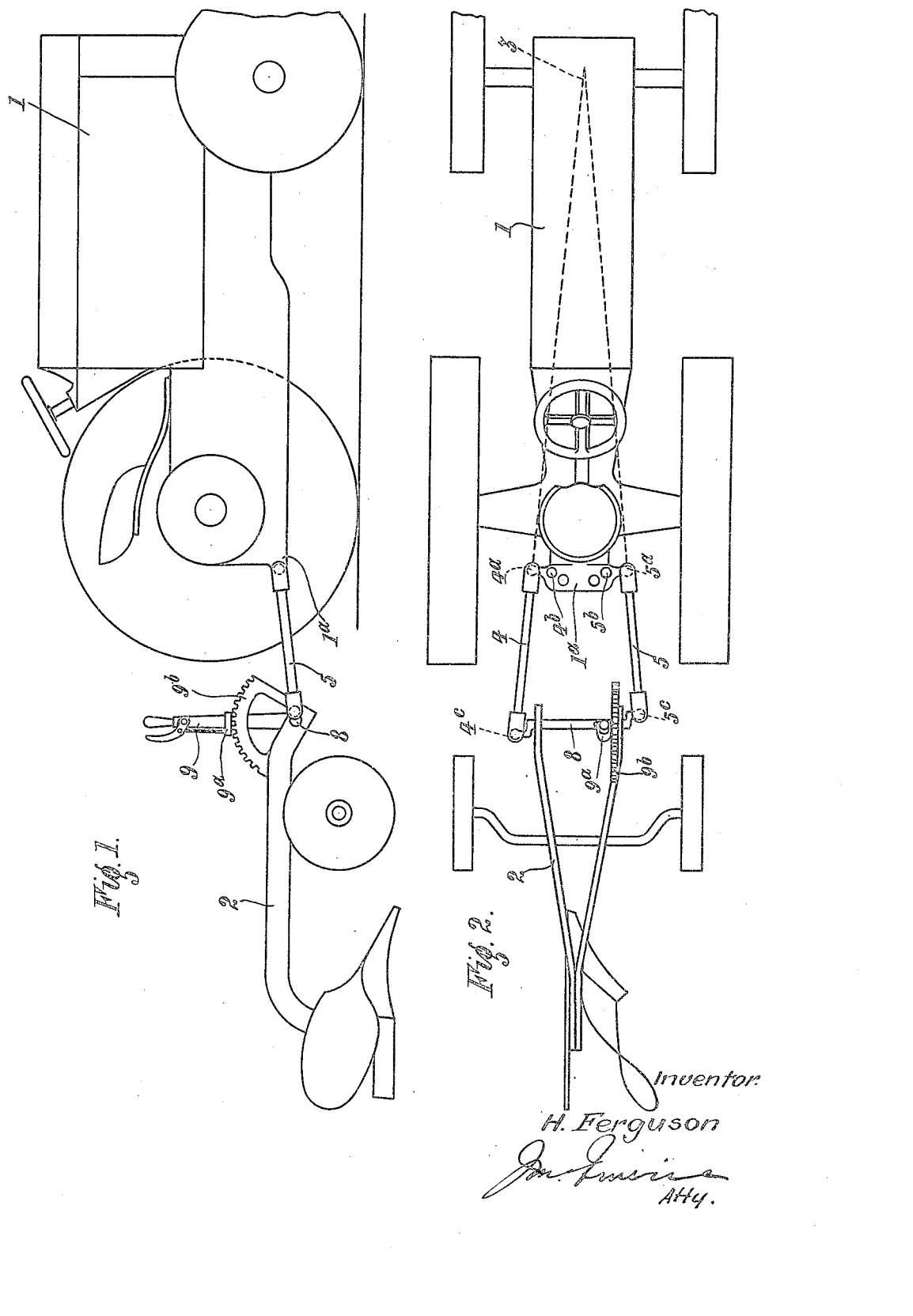

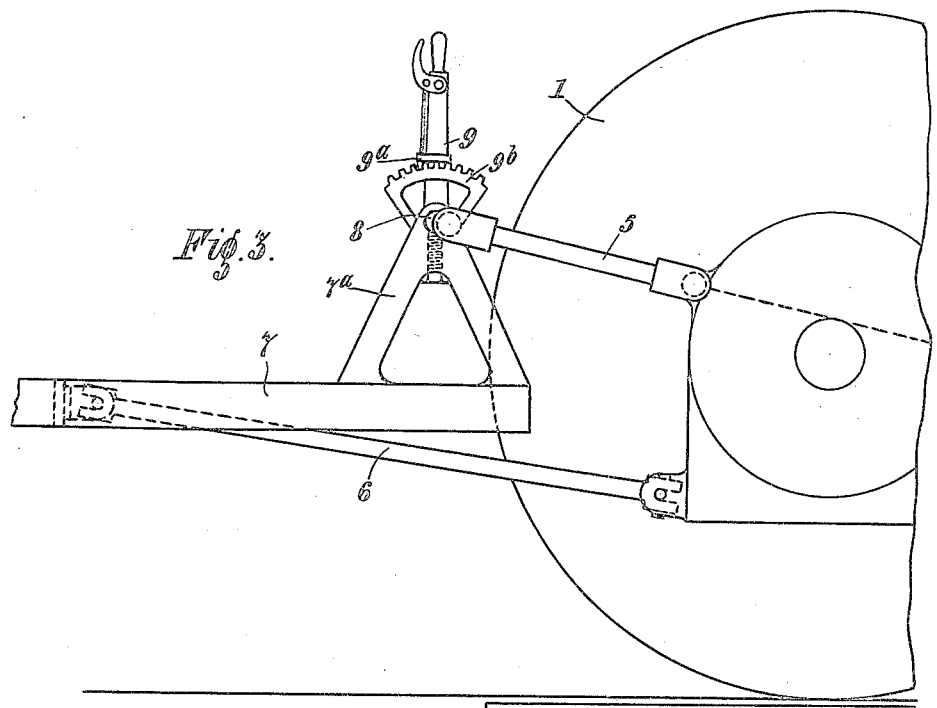
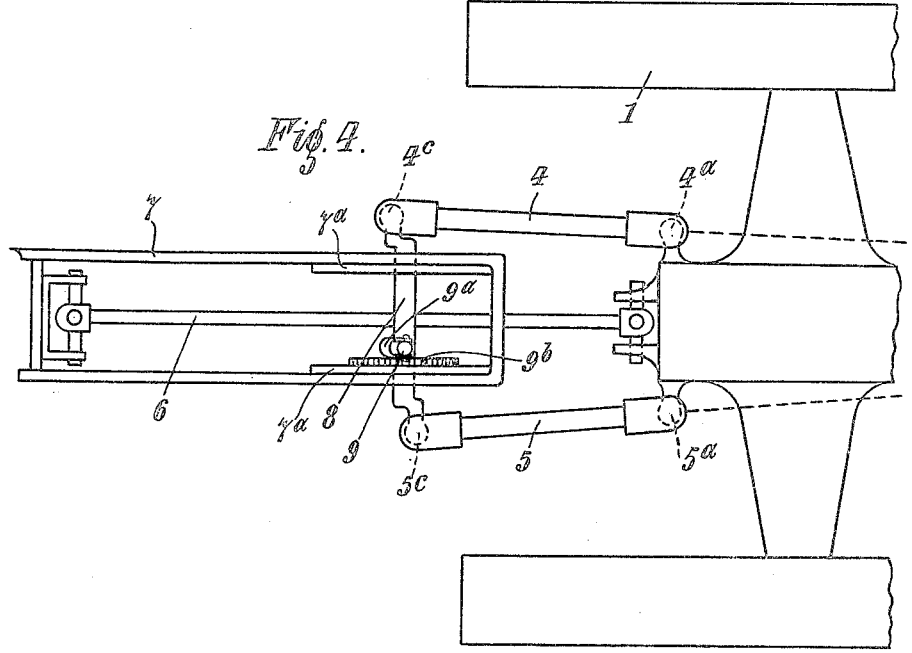

1,916,945

UNITED STATES PATENT OFFICE

HARRY FERGUSON, OF BELFAST, IRELAND

TRACTOR-DRAWN AGRICULTURAL IMPLEMENT

Application filed June 6, 1929, Serial No. 368,876, and in Great Britain July 3, 1928.

This invention relates to the attachment of agricultural implements to tractors and has for its object means for so hitching an implement to a tractor, that many of the present day difficulties will be overcome. For example, the attachment of an ordinary tractor plough to a tractor is made by a vertical pin behind the rear axle of the tractor, this being necessary in order that the tractor may turn to right and left without allowing the implement to strike the tractor wheels. There are many objections to this form of connection. For example, when ploughing on a hillside the rear end of the tractor slides down the hill, and this carries the implement with it and makes the work very unsatisfactory. Cultivating row crops presents one of the greatest difficulties in using a tractor, because the ordinary single pin connection for an implement means that the implement itself has to be a long way behind the tractor and will wander to either side and destroy the crops. If, when using a tractor, for row crop work the operator, for example, steers to the left, this has the effect of first moving the implement momentarily to the right, owing to the fact that the point of attachment is behind the rear axle. The ideal thing would be to attach the implement close to the front axle and it would then follow the steering, but such attachment would prevent lateral and vertical freedom of movement for the implement.

In my prior Patent No. 1,464,130, August 7, 1923, a link motion hitch is described which causes the effective line of draft to be from a position other than that of the actual connection between the tractor and the implement so that the implement is held down in the ground.

According to the present invention, I provide means constituting a hitch connection for coupling an implement to a tractor comprising links and means for connecting the links to both the tractor and the implement at points spaced apart, the said connecting means and the spacing thereof being such that, in operation, the implement will swing laterally in such manner as to follow the steering of the tractor.

Moreover, I may arrange the said hitch connection so that there is combined with the lateral swinging movement specified, an effective line of draft acting from a position other than that of the said actual connection between the implement and the tractor.

The invention will now be described with reference to the accompanying drawings whereon, by way of example only, I have shown how the invention may be applied to a plough, and also how the invention may be combined with the draft connection described in my prior Patent No. 1,464,130. The invention is illustrated in the accompanying drawings, in which:

Fig. 1 is a side elevation of a tractor and a one furrow plough attached to the tractor in accordance with this invention.

Fig. 2 is a plan view corresponding to Fig. 1.

Fig. 3 is a side elevation of part of a tractor and of part of an implement attached thereto, according to a modified form of the invention.

Fig. 4 is a plan view corresponding to Fig. 3.

Referring to the drawings, the numeral 1 denotes a tractor and 2 a plough. The tractor has a rearward extension $1^a$ which has two lateral ball projections $4^a$, $5^a$ and a series of upstanding ball projections $4^b$, $5^b$ of which there is an even number.

The plough has a transverse shaft 8 rotatably mounted in it and having cranked ends which are set at different angles to the shaft. The cranks terminate in balls $4^c$ and $5^c$. A hand lever 9 is fixed on the shaft 8, this lever having a detent $9^a$ engaging with a toothed sector $9^b$ fixed on the plough.

Two links 4 and 5 having sockets at both ends are fitted over the balls $4^a$, $4^c$ and $5^a$, $5^c$ to couple the plough to the tractor and allow universal freedom of movement between the two. The distance between the rear ends of the links is greater than the distance between their front ends.

When, in ploughing, the tractor is turned to the left or right the plough does not swing laterally about the centre of the rearward extension $1^a$ of the tractor, but the effect of the quadrilaterally arranged linkage is to cause it to swing as if it were pivoted about a center forward of the actual connection between it and the tractor. If the centre lines of the links are produced until they intersect, the point 3 where they intersect is the virtual centre about which swinging takes place. The plough and tractor function as if the plough were attached at the center 3. As a result, should the tractor be turned to the left or right the plough is immediately turned in the same direction.

By attaching the forward ends of the links to the intermediate balls 4b, 5b the virtual centre can be brought nearer the back axle of the tractor but still forward of the actual connection.

If the tractor and plough are being used for ploughing along a hillside, the plough will not "drift" down the hill with the rear end of the tractor, but will follow the virtual swinging centre which is controlled by the steering and thus better results will be obtained. In the case of row crop cultivation where the tractor operator may have allowed the tractor to get too close to one side of the row, he would require to steer away from the row in order to get into the correct position again. If he were using an ordinary wheeled implement hitched with a single pin behind the rear axle, steering away from the row would have the momentary effect of throwing the implement in the wrong direction and into the crop, because its actual connection with the tractor would be behind the rear axle of the tractor. When using the hitch according to this invention, the implement would immediately follow the steering and come away from the crop.

Referring to the modification shown in Figs. 3 and 4, the implement frame 7 is provided with two upstanding triangular frames 7a, 7a at whose vertices a cross shaft 8, corresponding to that referred to in Figs. 1 and 2, is journalled, this shaft having cranked ends linked to the rear of the tractor as before and a lever 9 on it.

A lower link 6 is universally jointed to the implement frame 7 and to the rear end of the tractor.

This form of upper and lower linkage permits the implement to have vertical and lateral freedom while giving a virtual swinging centre forward of the actual connection and an effective line of draft from a point other than the said actual connection, the last feature being as in my prior. Patent No. 1,464,130.

By turning the cross shaft 8, the angle of the implement relatively to the tractor is altered. In the case of a plough, the adjustment provides for regulating the width of the front furrow in the case of a two-bottom plough, or the width of the furrow in the case of a single-bottom plough. In the case of a row crop cultivator, the same adjustment enables the operator to shift the position of his implement laterally, relative to the tractor, so that it will follow the desired path behind the tractor. Instead of having the crank shaft 8 on the implement, I may have it on the tractor, but preferably I would carry it on the implement.

As an alternative to using a cranked shaft as hereinbefore described, I may make provision for shortening or lengthening either or both of the links 4 and 5, and in this way, change the angularity of the implement relatively to the tractor, for the adjustments mentioned.

Suitable stoppers could be provided to prevent the implement from swinging into the tractor wheels.

I claim:—

1. A hitch connection for coupling an agricultural implement to a tractor comprising two spaced universal mountings on the tractor, two links each secured at one end to one of said mountings, a cross shaft turnably secured to the implement, a crank at each end thereof, the cranks being set at different angles to the shaft and the second ends of the links being universally secured to the cranks, and means for rotating said shaft to vary the relative positions of the links.

2. A hitch connection for coupling an agricultural implement to a tractor comprising quadrilaterally arranged linkage having one side attached to the implement and the opposite side on the tractor having universally jointed vertices, and, in combination therewith, a lower linkage connection.

3. A hitch connection for coupling an agricultural implement to a tractor comprising two spaced universal mountings on the tractor, two links each secured at one end to one of said mountings, two spaced universal mountings supported by the implement and to which the second ends of the links are secured, and a lower linkage connection.

4. A hitch connection for coupling an agricultural implement to a tractor comprising two spaced universal mountings on the tractor, two links each secured at one end to one of said mountings, two spaced universal mountings supported by the implement and to which the second ends of the links are secured, mechanism for adjusting the relationship of links to one another, and a lower linkage connection between the tractor and the implement.

5. Means constituting a hitch connection for coupling an agricultural implement to a tractor comprising two spaced universal mountings on the tractor, two links each secured at one end to one of said mountings, a cross shaft turnably secured to the implement, a crank at each end thereof, the cranks being set at different angles to the shaft and the second ends of the links being universally secured to the cranks, means for rotating said shaft to vary the relative positions of the links, and a lower linkage connection between the tractor and implement.

6. A hitch connection for coupling an agricultural implement to a tractor comprising a plurality of spaced universal mountings on the tractor, two links whose forward ends can be secured to any two of the said mountings, a cross shaft turnably secured to the implement, a crank at each end thereof, the cranks being set at different angles to the shaft and the second ends of the links being universally secured to the cranks, and means for rotating said shaft to vary the relative positions of the links.

7. A hitch connection for coupling an agricultural implement to a tractor comprising a plurality of spaced universal mountings on the tractor, two links whose forward ends can be secured to any two of said mountings, a cross shaft turnably secured to the implement, a crank at each end thereof, the cranks being set at different angles to the shaft and the second ends of the links being universally secured to the cranks, means for rotating said shaft to vary the relative positions of the links, and a lower linkage connection between the tractor and the implement.

8. Means for constituting a hitch connection for coupling an implement to a tractor comprising elements spaced apart for connecting the implement to the tractor to give free lateral swinging movement of the implement relative to the tractor about centers within a relatively small area located apart from the actual connection between the tractor and the implement.

9. Means for attaching an implement to a tractor comprising spaced connecting members universally attached to the tractor and to the implement, said members permitting free lateral and vertical movement of the implement relative to the tractor when in operation, the members being so spaced that in operation free lateral swinging of the implement is permitted relative to the tractor about centers within a relatively small area located apart from the actual connection between the tractor and implement.

10. Means for attaching an implement to a tractor comprising spaced connecting links and universal means for connecting said links at spaced points on the tractor and on the implement, the links permitting free vertical and lateral movement of the implement relative to said tractor when in operation and the spacing of said links relative to the tractor causing the implement to swing laterally about centers within a relatively small area located apart from the actual connection between the tractor and the implement.

11. Means for connecting an implement to a tractor consisting of spaced connecting members universally attached to the tractor and the implement, said members permitting free lateral and vertical movement of the implement relative to the tractor when in operation, said members being spaced to permit free lateral swinging of the implement relative to the tractor about centers within a relatively small area located apart from the actual connection between the tractor and the implement, in combination with a secondary linkage between the tractor and the implement, said secondary linkage preventing the implement being raised from the ground by rearward pressure on the ground-engaging part of the implement.

12. Means for attaching an implement to a tractor comprising spaced connecting links and universal means for connecting said links at spaced points on the tractor and on the implement to provide for free lateral and vertical movement of the implement relative to the tractor when in operation, the spacing of said links providing for free lateral swinging of the implement relative to the tractor about centers within a relatively small area located apart from the actual connection between the tractor and the implement, and a secondary linkage connection between the implement and the tractor adapted to hold the implement down against rearward pressure on the ground-engaging part of the implement.

13. Means for connecting an implement to a tractor comprising a primary linkage and a secondary linkage in superposed relation, said primary linkage consisting of two spaced connecting elements, and universal means for connecting said elements to the tractor and the implement, and said secondary linkage consisting of connecting means universally attached to the tractor and the implement.

14. Means for connecting an implement to a tractor comprising a primary linkage and a secondary linkage in superposed relation, said primary linkage consisting of two spaced connecting elements, and universal means for connecting said elements to the tractor and the implement, and said secondary linkage consisting of a connecting link, and universal means connecting said link to the tractor and the implement.

15. Means for connecting an implement to a tractor comprising a primary linkage and a secondary linkage in superposed relation, said primary linkage consisting of two spaced, forwardly convergent links, and universal means for connecting said links to the tractor and the implement, and said secondary linkage consisting of connecting means universally attached to the tractor and the implement.

16. Means for connecting an implement to a tractor comprising a primary linkage and a secondary linkage in superposed relation, said primary linkage consisting of two spaced, forwardly convergent links, and universal means for connecting said links to the tractor and the implement, and said secondary linkage consisting of a connecting link, and universal means connecting said link to the tractor and the implement.

17. A hitch connection for coupling an implement to a tractor, comprising elements spaced apart and connecting the implement and tractor, the movement of the implement relative to the tractor being a swinging movement through said spaced-apart elements, each increment of the swinging movement of the implement being about a center located apart from the actual connection between the tractor and the implement including said elements.

In testimony whereof I affix my signature.

HARRY FERGUSON.